FIG. 2

INVENTORS
Lloyd R. Price
Robert T. Ferguson Jr.
BY
*Victor D. Borst*
ATTORNEY

INVENTORS
Lloyd R. Price
Robert T. Ferguson Jr.

Aug. 19, 1958

L. R. PRICE ET AL 2,848,225

TAG MAKING MACHINE AND METHOD

Filed Feb. 10, 1956

INVENTORS
Lloyd R. Price
Robert T. Ferguson Jr.
BY Victor D. Borst
ATTORNEY

Aug. 19, 1958    L. R. PRICE ET AL    2,848,225
TAG MAKING MACHINE AND METHOD
Filed Feb. 10, 1956    7 Sheets-Sheet 5

INVENTORS
Lloyd R. Price
Robert T. Ferguson Jr.
BY
Victor D. Borst
ATTORNEY

Aug. 19, 1958 L. R. PRICE ET AL 2,848,225
TAG MAKING MACHINE AND METHOD
Filed Feb. 10, 1956 7 Sheets-Sheet 6

INVENTORS
Lloyd R. Price
Robert T. Ferguson Jr.
BY
Victor D. Borst
ATTORNEY

Aug. 19, 1958  L. R. PRICE ET AL  2,848,225
TAG MAKING MACHINE AND METHOD
Filed Feb. 10, 1956  7 Sheets-Sheet 7

INVENTORS
Lloyd R. Price
Robert T. Ferguson Jr.
BY Victor D. Borst
ATTORNEY 2,848,225
Patented Aug. 19, 1958

2,848,225

TAG MAKING MACHINE AND METHOD

Lloyd R. Price, Darien, Conn., and Robert T. Ferguson, Jr., Charlotte, N. C., assignors to Robinson Tag & Label Company, New York, N. Y., a corporation of New York Application February 10, 1956, Serial No. 564,654

21 Claims. (Cl. 271—2.6)

This invention relates broadly to a method of and an apparatus for making of tags, labels, tickets and the like. More specifically the invention relates to a web feeding mechanism by which the running register of a web being fed thereby can be automatically minutely adjusted while the web is being fed through an otherwise standard tag machine. But although the web feeding mechanism is shown and described herein in connection with a standard tag machine, it will be apparent that it is equally well adapted for use with various other types of machines through which a web is fed either continuously or intermittently.

Heretofore in the manufacture of tags, labels, tickets and the like a paper web of the proper width was intermittently fed past the various operating stations of a standard tag machine by a pair of opposed feeding rolls which were intermittently rotated from a constantly rotating shaft through an adjustable ratchet and pawl mechanism by which the length of the web being fed by each actuation of the pawl can be manually adjusted in multiples of one tooth of the ratchet, no finer or more minute adjustment being possible. During the dwells in the movement of the web it was operated on at the various stations in accordance with the particular tag, etc. for which the machine was set up and adjusted to make. For instance at one station the web could be printed on one side, at the next station it could be printed on the other side, at the next station it could be perforated and at the last station the tag or label would be punched out of or cut off of the web. In tag machines the printing mechanisms are always of necessity of the letter press type, and the widths of the tag or label is determined by the width of the web or by the punch out mechanism when used and the length of the tag or label is determined by the adjustment of the actuating mechanism for the feeding rolls, the adjustment being such that each actuation of the feeding rolls advances the web the length of one tag or label.

Some users of tags and labels who use a variety of different tags and labels have adopted a common shape and pattern for all of their tags or labels with additional indicia thereon which varies in accordance with the use of the various different tags or labels. For instance one tag or label may specify one brand name and another tag or label with the same printed pattern may specify a different brand name.

According to our new method of making various different tags having a common pattern or background, we first continuously feed a long web of material through a printing press and successively print the tag or label background thereon. After leaving the printing press the web is wound into a coil and then stored until we have an order for a specific tag or label having this background. The coil is then taken from storage and the printed web run through a tag machine in which the additional indicia is printed on the web in the proper place with respect to the previously printed pattern, after which the tag or label is punched out of or cut off of the web. By this method we are enabled to manufacture tags and labels having various different colors thereon, and to superimpose one color upon another, which is not possible when using a standard tag machine alone. Also, it greatly expedites the filling of orders for tags and labels as they are received, and reduces the cost of manufacture in that the background pattern can be printed during otherwise idle times.

When this method was first used one difficulty was encountered which was due to the fact that a paper web will elongate or contract as much as five percent (5%) due to varying climatic conditions. This necessitated the providing of a different web feeding mechanism for the tag machine whereby the feeding of the web therethrough could be automatically minutely adjusted so that the additional indicia being printed thereon and the punching out or cutting off of the finished tag by the tag machine would always be in the proper position with respect to the previously printed background pattern.

When all of the printing on a tag or label is done in the tag machine the elongation or contraction of the web due to different climatic conditions is immaterial, as it only causes the lengths of tags made under different climatic conditions to vary slightly in length at the most by five percent (5%), which does not affect the printing on the tag or label. But when the background is printed on the web under one climatic condition and additional printing is superimposed thereon and the tag punched out of or cut off of the web under a different climatic condition, a different situation arises, as the superimposed printing must be accurately positioned on each successive tag, after which each tag must be accurately presented to the punch out or cut off mechanism with respect to the printing thereon. While an error of 5% in the position of the superimposed printing and the cutting out of the tag, with respect to the previously printed background, may be of little consequence, the fact is that this error due to different climatic conditions is accumulative when the web with the previously printed background thereon is being fed through the tag machine. This means that the error in each successive tag progressively increases directly in proportion to the percent of elongation or contraction of the web between the time the background was printed thereon and the time the making of the tag is completed in the tag machine.

Therefore, in order to accurately and minutely control the running register of the previously printed web with respect to the various stations in a tag machine, we retain the manually adjustable ratchet and pawl mechanism by which the web feeding rolls are driven and we provide an additional adjusting means which automatically varies the rate of feed of the web in accordance with certain index marking cut or otherwise placed thereon by the printing press when printing the background.

In accordance with our invention we provide two opposed feeding rolls by and between which the web is adapted to be fed, and which are intermittently driven in unison in opposite directions by a manually adjustable ratchet and pawl mechanism which in turn is operated from a constantly rotating power shaft. Each of these feed rolls has a generally toric periphery of such a nature that the diameter thereof progressively increases from a minimum at one side thereof to a maximum at the other side thereof.

Hereafter in both the specification and the claims the term "toric," when used in connection with these feed rolls, is intended to also define the periphery of rolls which are segments of a sphere in which both centers of curvature of the periphery are located in the axis of rotation of the roll, as well as rolls which are not segments of a sphere. In other words, a roll having a toric periphery is any roll in which the periphery thereof is curved in two planes at right angles to each other in such a manner that the diameter of the roll progressively increases from a minimum at one side thereof to a maximum at the other side thereof.

One of these feed rolls is secured upon a fixed rotatable shaft mounted in suitable bearings, and the other roll is secured upon a shiftable shaft which is rotatably supported in bearings carried by an adjustably mounted bearing block. The mounting for the bearing block is such that the angular relation between the fixed shaft and the shiftable shaft can be varied with respect to each other while maintaining the distance between the two rollers, at their lines of contact with the web therebetween, constant. The fixed shaft is intermittently rotated by the ratchet and pawl mechanism, and the shiftable shaft is geared to the fixed shaft for rotation therewith. By changing the angular relation of the axis of the shiftable shaft with respect to the axis of the fixed shaft, the lines of contact of the rollers with the web therebetween can be shifted, as desired, from side to side of the rollers. As these lines of contact are shifted from adjacent the maximum diameter sides of the rollers towards the minimum diameter sides of the rollers, the length of web being fed by each revolution of the rollers will be proportionately decreased. The closer these lines of contact are to the maximum diameter sides of the rollers, the more the web will be fed by each revolution of the rollers and vice versa.

The bearing block for the shiftable shaft is adapted to be moved back and forth in its mounting by a small pinion gear which meshes with a rack carried by the bearing block and is driven by a reversible electric motor. The energization of the electric motor is controlled by a detector which comprises a photoelectric cell and a source of light, preferably an electric lamp.

During the printing of the successive tag backgrounds on the web in the printing press, index marks are also placed along one edge of the web in fixed relation to each tag background. The detector also includes a condensing lens and a focusing lens by which a concentrated ray of light from the lamp is directed against the edge of the web in position to be intercepted by the index marks on the web. If the running register of the web is properly synchronized in the tag machine with respect to the various stations thereof, the intermittent feeding of the web will always be stopped in the proper position with respect to the various stations. If, however, the ray of light strikes the web on one side or the other of an index mark, the photoelectric cell, through suitable amplifiers, relays and switches, will energize the electric motor in such a manner as to move the bearing block in one direction or the other and thereby change the angular relation of the feeding rolls with respect to each other so that they will feed more or less web each cycle as required. If the ray of light strikes the web in advance of an index mark, the angular relation of the rolls will be changed in a direction to cause them to feed more web each cycle; and if the ray of light strikes the web beyond an index mark, the angular relation of the rolls will be changed in a direction to cause them to feed less web each cycle. As soon as the angular relation of the rolls has been adjusted thereby to where the feeding of the web each cycle is properly synchronized, the ray of light will be focused directly on the index marks and the electric motor will be de-energized and remain de-energized until the index marks again get out of register with the light ray, which may happen several times during the feeding of a roll of web through the tag machine.

The principal object of the invention is to provide a new and improved method and apparatus for manufacturing tags, labels and the like whereby the design of the tags and labels may include several different contrasting colors and wherein one color may be superimposed upon another color.

Another object of the invention is to provide a new and improved method and means for manufacturing tags and labels whereby tag or label backgrounds may be successively printed on an elongated web by a printing press at one date and at a later date additional indicia may be accurately superimposed upon the previously printed backgrounds in a definite, predetermined position with respect thereto, and the finished tags or labels punched out of or cut off of the web by a tag machine.

Another object of the invention is to provide new and improved web feeding means for a tag machine or the like by which the running register of a web being fed through the machine may be accurately synchronized with respect to the various stations of the machine by automatic means which is responsive to index marks previously applied to the web.

Another object of the invention is to provide a web feeding mechanism of the aforesaid character which includes a pair of opposed feeding rolls by and between which a web is fed and in which one or both of said feeding rolls has a toric periphery of such a nature that the diameter of the roll progressively decreases from a maximum adjacent one side of the roll to a minimum at the other side of the roll.

Another object of the invention is to provide a web feeding mechanism of the aforesaid character having means by which the angular relation of the axes of said feeding rolls with respect to each other may be changed as desired to thereby shift the lines of contact of said rolls with a web therebetween toward one side or the other of said rolls whereby the length of web fed by each revolution of said rolls is varied in accordance with the position of said lines of contact on the rolls.

Another object of the invention is to provide a web feeding mechanism of the aforesaid character which includes means by which the distance between said rolls at their lines of contact with a web therebetween is maintained constant for all angular positions of the axes of said rolls with respect to each other.

Still another object of the invention is to provide a web feeding mechanism of the aforesaid character wherein the angular relation of the axes of said rolls with respect to each other is automatically changed by mechanism which is responsive to indicia on the web being fed.

A still further object of the invention is to provide new and improved mechanism for intermittently feeding a web through a tag machine which includes means by which the length of web fed each cycle can be manually adjusted in definite fixed multiples, and additional adjusting means by which the length of web fed each cycle is automatically further adjusted during the operation of the machine.

Other and more limited objects of the invention will be apparent from the following specification and the accompanying drawings forming a part thereof, wherein.

Figure 17:
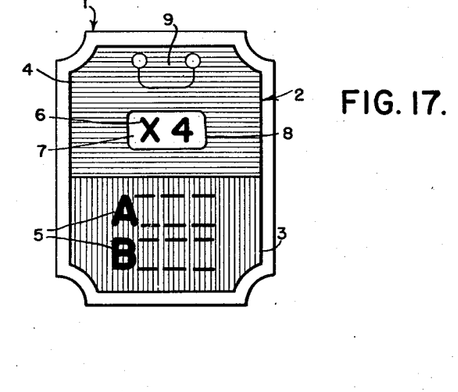
Fig. 17 is a plan view of a tag made in accordance with our new method and apparatus.
Figure 18:
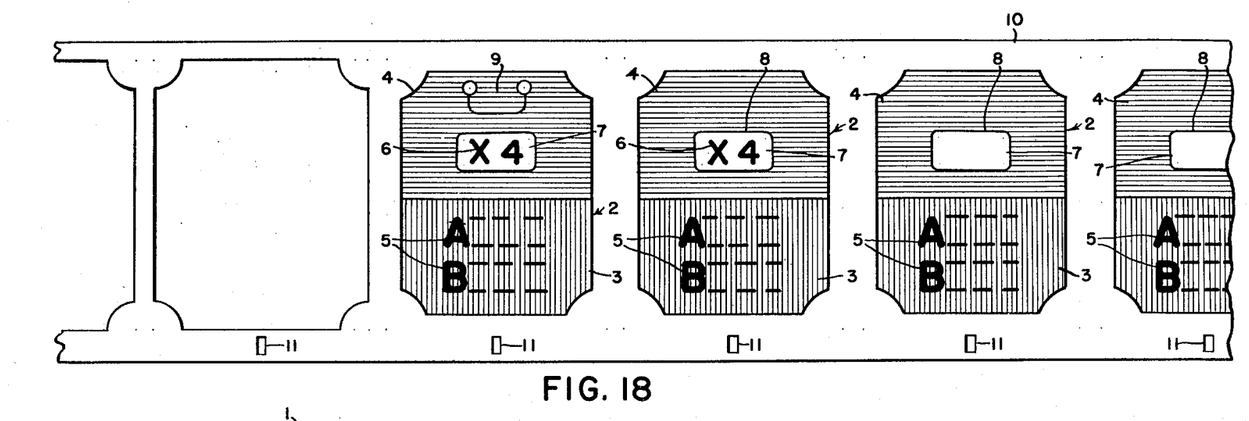
Fig. 18 is a fragmentary view of a section of paper web, from which the tags of Fig. 17 are made, and showing the successive operations performed thereon first by a printing press and then by the tag machine of our invention in making the tag of Fig. 17.

Referring now to first Figs. 17 and 18 of the drawings by reference characters, the numeral 1 indicates generally one design of a paper tag or label of the type adapted to be made by our new and improved method and apparatus. The tag 1 as shown herein has a pattern 2 printed thereon which comprises a border 3, and a background 4 of two contrasting colors. Indicia 5 is superimposed upon the lower portion of the background, and indicia 6 is printed on the tag 1 in the blank space 7 within the border 8 in the upper portion of the background 4. An attaching tab 9 is cut as shown adjacent the upper edge of the tag.

In making the tags 1 successive pattern 2 comprising the borders 3 and 8, the background 4 and the indicia 5 are printed upon an elongated paper web 10 in a printing press. Index marks 11 are also placed upon the web 10 below each successive pattern by the printing press. These index marks may be cut out along one edge of the web as shown herein or they may be printed on the web or they may be incorporated in the patterns as a part thereof. As the printed web leaves the printing press it is coiled into a roll 12 which is afterwards transferred to a standard type tag machine having a plurality of operating stations incorporated therein. The web is then intermittently fed through the tag press past the several operating stations therein. During the dwells in the movement of the web the indicia 6 is printed in the blank spaces 7 by the letter press method at one of the operating stations; the attaching tabs 9 are cut in the web at another operation, and the finished tags 1 are punched from the web 10 at the last operating station.

Figure 1:
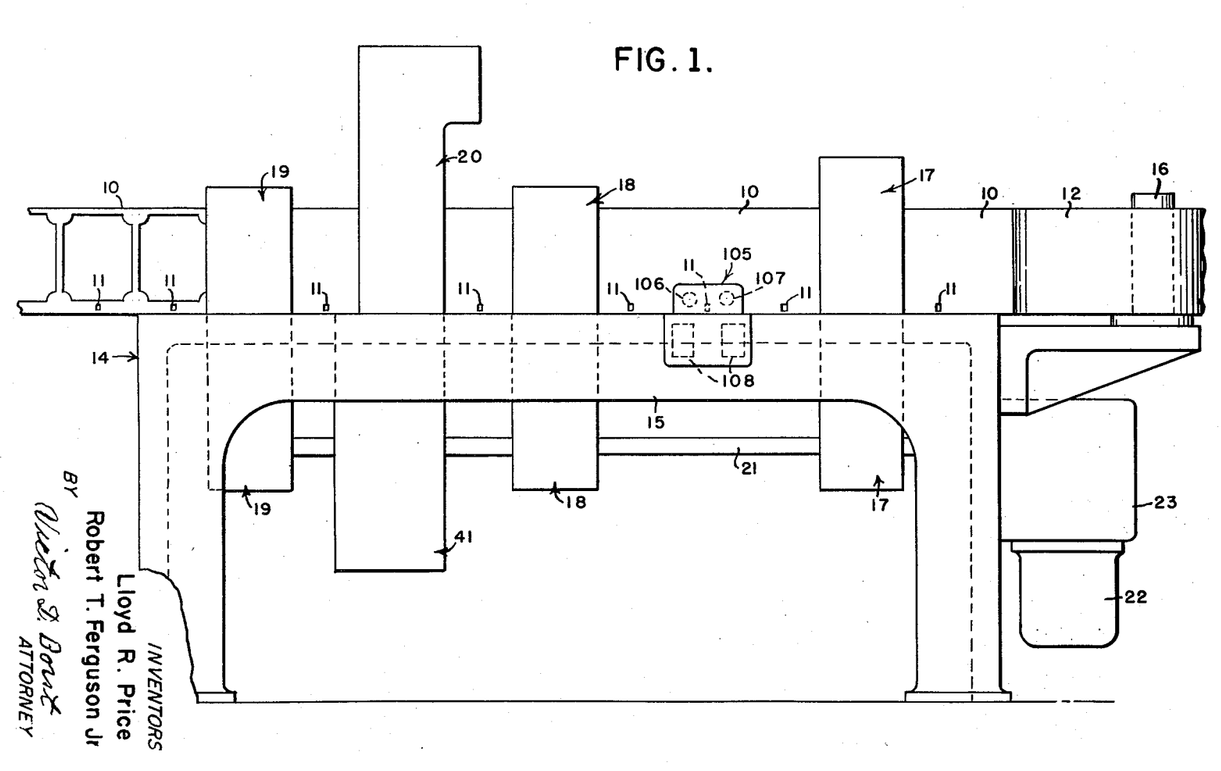
Fig. 1 is a diagrammatic view of a tag machine having our new and improved web feeding and registering mechanism applied thereto.

The tag machine 14 which is diagrammatically shown in Fig. 1 comprises a frame 15, a web supporting reel 16, the operating stations 17, 18 and 19, and the web feeding mechanism, generally indicated by the numeral 20, by which the web 10 is intermittently fed from the reel 16 and successively past the operating stations 17, 18 and 19 respectively.

Printing mechanism of the letter press type by which the indicia 6 is printed in the blank spaces 7 is operatively mounted upon the frame 15 at the operating station 17; cutting mechanism by which the attaching tabs 9 are cut is located at the operating station 18, and punch out mechanism by which the finished tags are punched out of the web 10 is located at the station 19. The printing mechanism, the cutting mechanism, the punch out mechanism and the web feeding mechanism 20 are all operated, in synchronism with each other from a power shaft 21 through suitable driving connections. The power shaft 21 is driven by a motor 22 through suitable speed reducing means 23.

The tag machine 14, with the exception of the web feeding mechanism 20, is of standard well known construction. Consequently it is believed to be unnecessary to illustrate and describe the tag machine 14 as a whole in more detail herein. The drawings and specification with respect to the tag machine are therefore confined to the specific construction of our new and improved web feeding mechanism 20 which is so constructed and arranged that it may be readily substituted for any of the web feeding mechanisms now in use on standard tag machines of the aforesaid type.

When making tags or labels such as shown in Fig. 17 by our method, it is essential that the intermittent feeding of the web 10, having the previously printed patterns 2 thereon, past the successive operating stations 17, 18 and 19 of the tag machine 14, be accurately and minutely controlled in order that the indicia 6 will always be properly positioned within the border 8 of successive patterns 2, and the finished tags 1 accurately punched from the web 10 with respect to the borders 3.

As previously pointed out, paper such as used in making tags or labels of the type shown will elongate or contract as much as five percent (5%) due to different climatic conditions. When all of the printing, perforating and punching out of successive tags from an elongated web is done in a tag machine, this elongation or contraction of the paper web can be and is disregarded, since it affects only the overall width of the tags or labels and not the positioning of any indicia, etc., thereon. But when manufacturing tags or labels according to our method, the intermittent feeding of the previously printed web through the tag machine must be accurately adjusted in accordance with the climatic condition prevailing at that time. This is especially true when the patterns 2 are printed on the web on one date in a printing press and the other operations are performed in a tag machine at a later date. This necessity for accurate adjustment is due to the fact that any error in the presenting of successive patterns 2 at the various operating stations 17, 18 and 19 is accumulative so that the error in the positioning of each successive pattern 2 progressively increases directly in proportion to the percent (%) of elongation or contraction of the web between the time the patterns 2 were printed thereon and the time the other operations are performed on the web in the tag machine.

The web feeding mechanism 20 by which the web 10 is intermittently fed through the tag machine 14 and the running register thereof automatically controlled with respect to the operating stations 17, 18 and 19 will now be described, reference being had to Figs. 2 to 10 of the drawing. This mechanism comprises a pair of opposed similar feed rollers 25 and 26 by and between which the web 10 is adapted to be fed. The roller 25 is secured to a shaft 27 which is rotatably mounted in suitable bearings 28 carried by bearing brackets 29 which are rigidly secured to a mounting plate 30; and the roller 26 is secured to a shaft 31 which is rotatably mounted in suitable bearings 32 carried by a bearing block 33 which is adjustably mounted upon the plate 30. The shaft 27 and the roller 25 carried thereby are adapted to be rotated by a shaft 34 which is connected to the shaft 27 by a universal joint coupling 35; and the shaft 31 and roller 26 carried thereby are adapted to be rotated, in the opposite direction, in unison with the shaft 27 and roller 25 through meshing similar gears 36 and 37 which are suitably mounted in fixed position on the plate 30 and are connected to the shafts 27 and 31 respectively by universal joint couplings 38 and 39.

Figure 2:
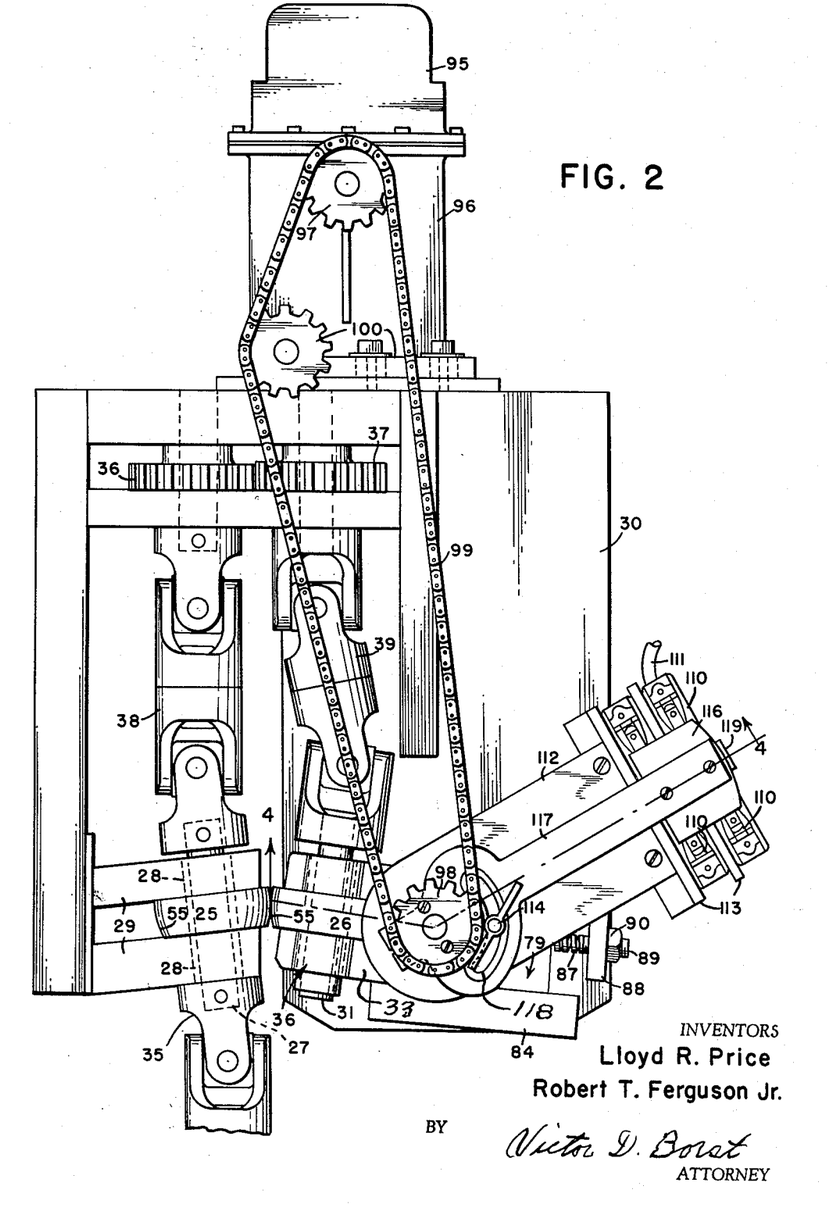
Fig. 2 is a front elevation of the feeding rolls and the adjusting mechanism therefor, showing them removed from the tag machine.
Figure 8:
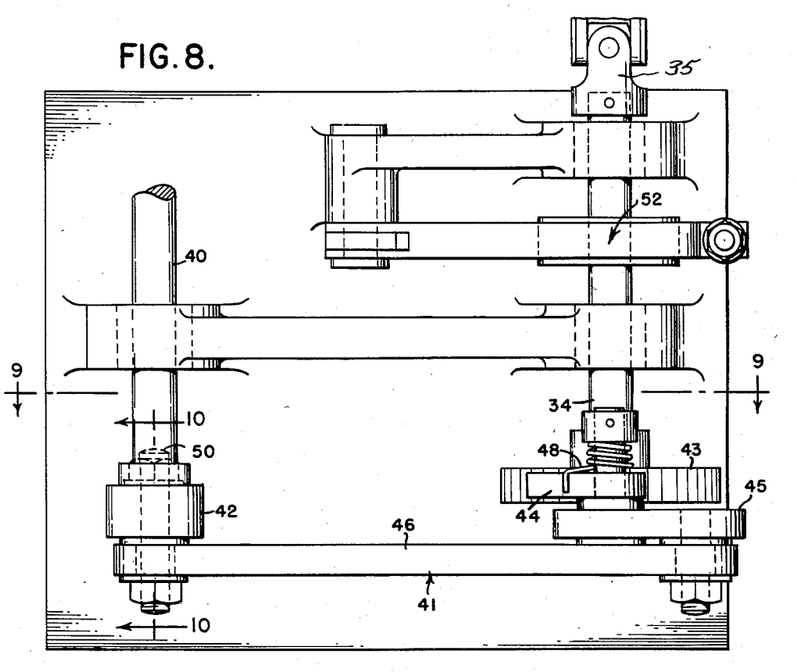
Fig. 8 is a front elevation of the driving mechanism by which the web feed rolls are intermittently rotated from a constantly rotating power shaft.
Figure 9:
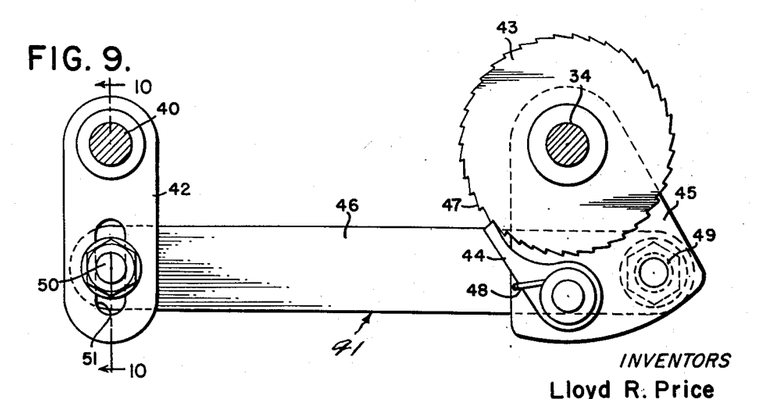
Fig. 9 is a horizontal section taken on the line 9—9 of Fig. 8.
Figure 10:
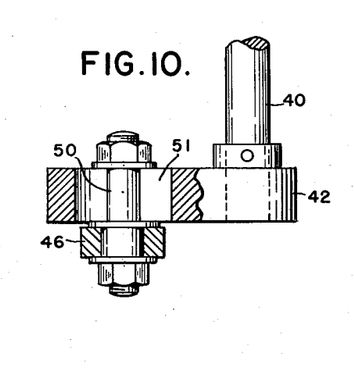
Fig. 10 is a detail fragmentary section taken on the line 10—10 of Fig. 9.

The shaft 34 is intermittently rotated in a clockwise direction by a constantly rotating shaft 40 through manually adjustable driving means generally indicated by the numeral 41; and the shaft 40 is rotated by the power shaft 21 through suitable connecting means, not shown.

The manually adjustable driving means 41 comprises a crank arm 42, a toothed ratchet wheel 43, a pawl 44, oscillatory arm 45, and a connecting link 46. The crank arm 42 is pinned or keyed to the lower end of the shaft 40, and the ratchet wheel 43 which has a plurality of equally spaced narrow teeth 47 extending around the periphery thereof is keyed to the shaft 34 adjacent the lower end thereof. The oscillatory arm 45, which is pivotally mounted upon the shaft 34 immediately below the ratchet wheel 43, carries the pawl 44 which is pivotally mounted thereon adjacent the outer end thereof and is spring pressed into engagement with the teeth 47 of the ratchet wheel 43 by a spring 48. One end of the connecting link 46 is pivotally connected to the oscillatory arm 45 by means of a pivot stud 49 which is carried by the arm 45 in fixed position, and the other end of the link 46 is pivotally connected to the crank arm 42 by means of a pivot stud 50 which is adjustably mounted in an elongated radially extending slot 51 in the crank arm 42. As the crank arm 42 is rotated it swings the arm 45 back and forth by means of the link 46, each revolution of the crank arm 42 imparting one complete oscillation to the arm 45. As the arm 45 is swung in a counter-clockwise direction (Fig. 9) the pawl 44 will slip or slide over the teeth 47 of the ratchet wheel 43, but as the arm 45 is swung back in a clockwise direction the pawl 44 will engage a tooth 47 and thereby rotate the ratchet wheel 43 and shaft 34 through the arc traversed by the arm 45 during its backward movement. The back and forth movement of the arm 45, and consequently the degree of rotation of the shaft 34 and the feed rollers 25 and 26, can be adjusted in multiples of one of the teeth 47 by varying the position of the pivot stud 50 in the slot 51, the closer the stud 50 is to the shaft 40 the less the rotation of the shaft 34 and feed rollers 25 and 26 during each rotation of the crank arm 42. A friction brake 52 is constantly applied to the shaft 34 to insure the immediate stoppage of the rotation of the shaft 34 and rollers 25 and 26 at the end of each driving movement of the arm 45 and pawl 44. From the foregoing it will be apparent that the feeding mechanism thus far described will intermittently feed the web 10 through the tag machine 14, and that the length of web fed by each actuation of the rollers 25 and 26 can be manually adjusted by changing the position of the pivot stud 50 in the slot 51 in the crank arm 42. This mechanism is perfectly satisfactory when all of the operations performed on a web in making tags or labels are done in a standard tag machine.

But when making tags, labels, and the like by our method, as described herein, it is necessary to provide a much finer adjustment of the length of web fed each cycle than that afforded by the shifting of the pivot stud 50 in the slot 51. Furthermore, in view of the fact that in a roll of web material the elongation or contraction of the web due to climatic conditions may vary in different sections of the roll, it is essential that this finer adjustment of the web feed be automatically controlled by the web itself in such a manner that the intermittent feeding of the web will always stop with the patterns 2 on the web in proper position with respect to the operating stations 17, 18 and 19. To this end we provide means by which the length of web fed by each rotation of the rolls 25 and 26 is automatically adjusted in accordance with the position of the index marks 11, previously printed on the web, with respect to the operating stations 17, 18 and 19.

In accordance with our invention we provide the feed rollers 25 and 26, which as shown herein are identical as to size and shape, with toric peripheries 55 of such a nature that the diameters thereof progressively increase from a minimum at one side of the rolls to a maximum at the other side thereof; and we construct the mounting for the adjustable bearing block 33 in such a manner that the axis of rotation of the roller 26 may be varied with respect to the axis of rotation of the roller 25 while maintaining the rollers 25 and 26 in contact with the web 10 therebetween. By changing the angular relation of the axes of rotation of the rollers 25 and 26 the lines of contact of the rollers 25 and 26 with the web 10 therebetween may be shifted as desired between the sides of maximum diameter of the rollers and the sides of minimum diameter thereof, and the length of web fed by each rotation of the rollers thereby increased or decreased, it being understood that the closer the lines of contact with the web are to the minimum diameter sides of the rollers, the shorter the length of web fed by each rotation of the rollers.

Figures 11, 12, 13, 14, 16:
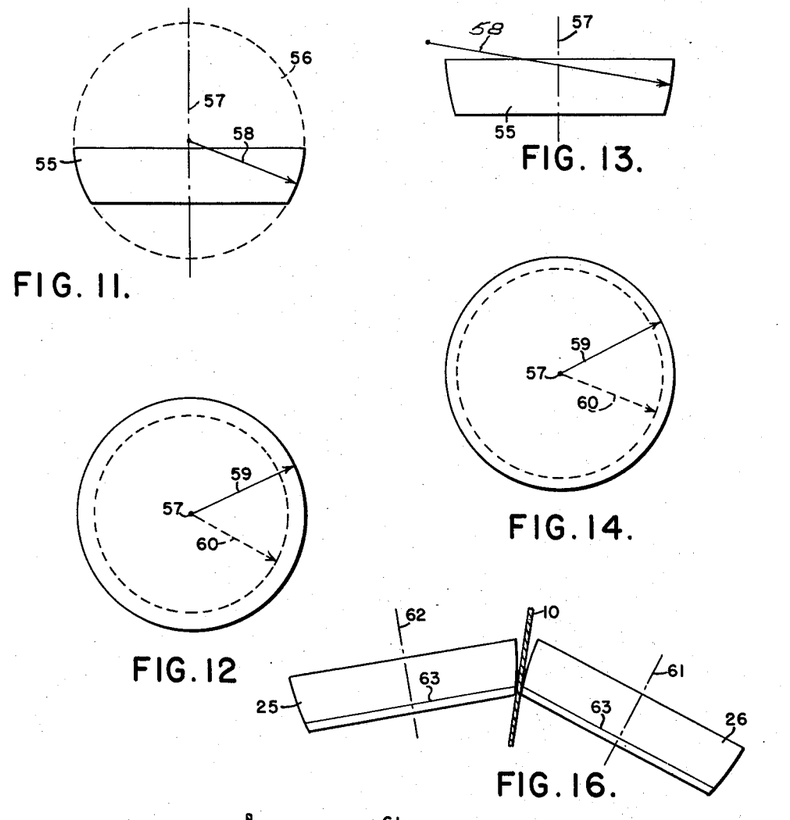
Fig. 11 is a side elevation of one of the similar feed rollers showing one manner of forming the rollers.
Fig. 12 is a plan view of the roller shown in Fig. 11.
Fig. 13 is a side elevation of one of the feed rollers illustrating another way of constructing the feed rollers.
Fig. 14 is a plan view of the roller shown in Fig. 13.
Fig. 16 is a view similar to Fig. 15 showing the relation of the feed rollers with respect to each other when they are adjusted to feed the minimum length of web each revolution thereof.

The rollers 25 and 26 may be constructed either as shown in Figs. 11 and 12 or as shown in Figs. 13 and 14. In Figs. 11 and 12 the rollers 25 and 26 are shown as segments of a sphere 56 in which all centers of curvature of the periphery 55 are located in axis of rotation 57. In these figures 58 indicates one radius of the periphery 55 and 59 and 60 indicate two other radii thereof, 59 being the radius of the maximum diameter side of the roller and 60 being the radius of the minimum diameter side of the roller. In Figs. 13 and 14 the radius of curvature 58 is much greater than in Figs. 11 and 12 with the center thereof located outside of the axis of rotation 57. The rollers 25 and 26 are preferably made as shown in Figs. 13 and 14 as this construction permits a much finer adjustment of the feeding of the web in proportion to a change in the angular relation of the axes of the rollers 25 and 26, and permits the use of much smaller rollers.

Figure 15:
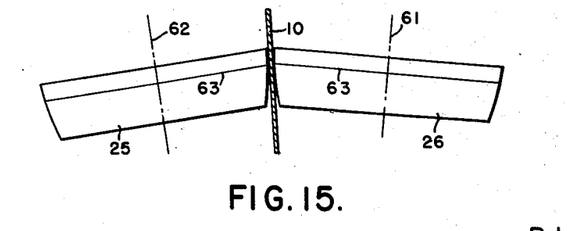
Fig. 15 is a diagrammatic view showing the relative relation of the feed rollers with respect to each other when they are adjusted to feed the maximum length of web each revolution thereof.

The manner in which the length of web fed by each rotation of the rollers 25 and 26 may be varied by changing the angular relation of the axes of rotation of the feed rollers 25 and 26 is diagrammatically illustrated in Figs. 15 and 16. In Fig. 15 the axis of rotation 61 of the roller 26 is substantially parallel to the axis of rotation 62 of the roller 25, and the lines of contact 63 of the rollers 25 and 26 with the web 10 are adjacent the maximum diameter sides of the rollers 25 and 26. In Fig. 16 the axis of rotation 61 of the roller 26 is disposed at a substantial angle with respect to the axis of rotation 62 of the roller 25, and the lines of contact 63 of the roller with the web 10 are adjacent the minimum diameter sides of the rollers. The length of web fed by each revolution of the rollers 25 and 26 will always be equal to the diameter of the rollers 25 and 26 at the lines of contact 63 with the web multiplied by 3.1416. The position of the lines on contact 63 on the rollers 25 and 26 therefore determines the length of web fed by each revolution of the rollers, and it will be apparent from a comparison of Figs. 15 and 16 that the greater the angle between the axes of rotation 61 and 62, the closer the lines of contact 63 will be to the minimum diameter sides of the rollers; and that the closer the lines of contact 63 to the minimum diameter sides of the rollers, the shorter the length of web fed by each revolution of the rollers.

The construction of the bearing block 33 for the roller 26 and the adjustable mounting therefor by means of which the angular relation between the axes of rotation may be changed will now be described, reference being had to Figs. 2 to 7 of the drawings. The block 33 comprises two opposed similar sections 70 and 71 which are bifurcated as indicated at 72 for the reception of the roller 26, and are recessed as shown at 73 for the reception of a rack 74 and a small meshing pinion gear 75. The two sections are secured together by screws 76 after the various parts carried by the block have been properly assembled therein. The block 33 is provided with two opposed arcuate grooves 77 which are adapted to receive a pair of opposed similar arcuate complementary ribs 78 carried by a slide generally indicated by the numeral 79.

Figure 7:
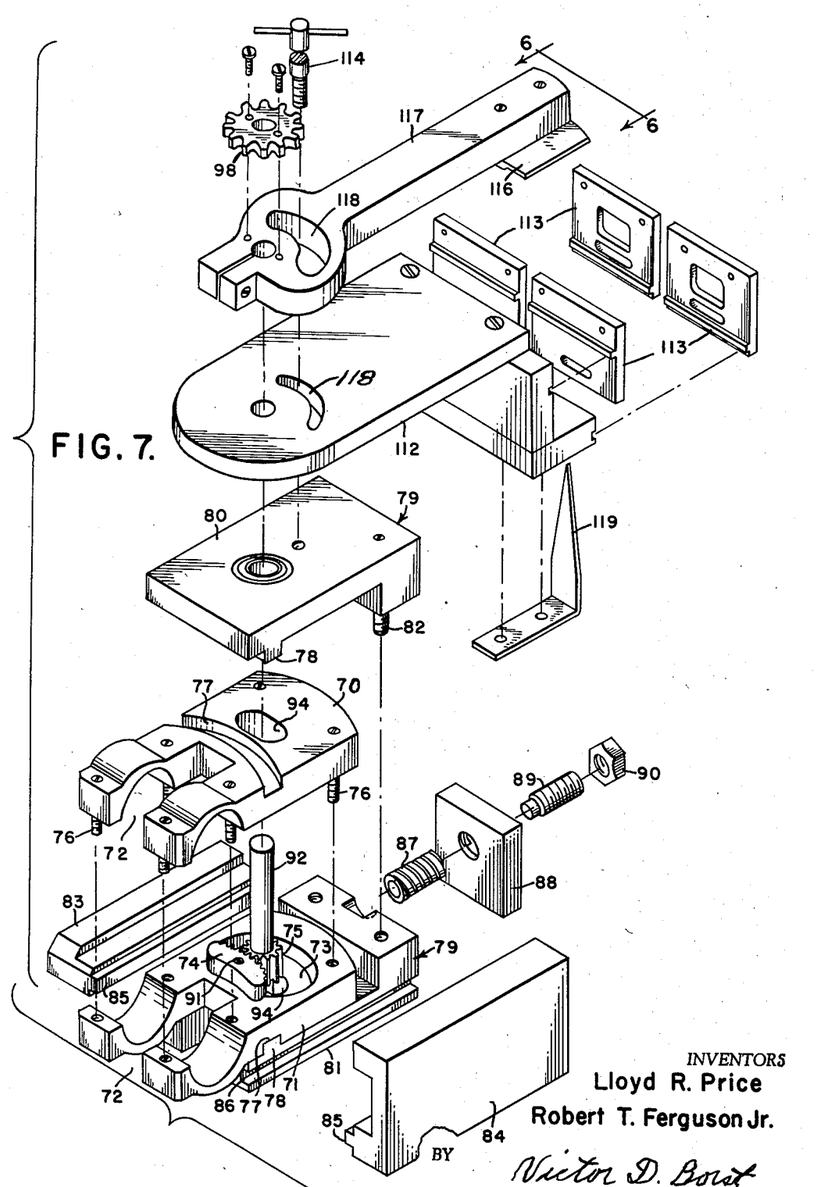
Fig. 7 is a perspective view of the various parts of the roll adjusting mechanism showing them in separated positions.

The slide 79 is generally U-shaped and comprises the upper and lower sections 80 and 81 respectively between which the bearing block 33 is slidably mounted by means of the cooperating grooves 77 in the block 33 and the opposed ribs 78 carried by upper and lower sections 80 and 81 of the slide 79. The sections 80 and 81 are secured together with the block 33 therebetween by screws 82. The slide 79 is slidably mounted upon the base plate 30, for transverse movement with respect thereto, between guides 83 and 84 having tongues 85 which engage grooves 86 in the lower section 81 of the slide. A spring 87 which is interposed between the slide 79 and a fixed abutment 88, carried by the base plate 30, is provided to yieldingly urge the slide 79 and with it the roller 26 towards the roller 25 to thereby maintain the rollers 25 and 26 in firm contact with the web 10 between the rollers. The pressure exerted by the spring is controlled by an adjusting screw 89 and lock nut 90.

The rack 74 is secured to the block 33 within the recess 73 by a screw 91, and the pinion gear 75 meshing with the rack 74 is secured to a shaft 92 which is rotatably mounted in bearings 93 carried by the slide 79 and extends through elongated slots 94 in the upper and lower sections 70 and 71 of the block 33. By rotating the shaft 92 and with it the pinion gear 75, the block 33 may be moved back and forth as desired on the ribs 78 carried by the slide 79. The curvature of the ribs 78 and the cooperating grooves 77 is such that movement of the slide will shift the roller 26 back and forth between the positions shown in Figs. 15 and 16 with a rolling contact between the periphery of the roller 26 and the periphery of the roller 25.

The shaft 92 and gear 75 secured thereto are adapted to be rotated by a reversible electric motor 95 through suitable speed reduction gearing 96, the sprockets 97 and 98 and the connecting sprocket chain 99. An adjustable chain tightener 100 is provided to take up and slack in the chain 99.

The energization of the motor 95 is automatically controlled by a detector and control mechanism 105 which is mounted on the tag machine 14 ahead of the web feeding mechanism 20 and is responsive to the index marking 11 on the web 10. The construction and operation of the detector and controls mechanism is such that it will effect the energization of the motor 95 for rotation in one direction if too little web is fed each cycle by the feed rollers 25 and 26, and in the other direction if too much web is fed each cycle. When the proper length of web is fed each cycle the motor will be de-energized.

The detector and control mechanism 105 comprises along with suitable focusing and condensing lenses and amplifiers a source of light 106, a photo-electric cell 107 and the relays 108. It is of standard commercial nature and per se forms no part of our invention. Consequently it is not shown and described in more detail herein. Mechanisms of this general type are shown in the patent to Smith No. 1,873,057 and in the patent to Brockhuysen No. 2,788,871.

In setting up the tag machine 14 for a particular tag and web, the major adjustment for the feeding of the web is manually made in the driving mechanism 41 after which a finer adjustment is automatically made, driving the feeding of the web, to the feed rollers 25 and 26, all as previously described. The manual adjusting means is such that the length of the web fed each cycle can only be adjusted accurately in increments of one of the teeth 47 of the ratchet wheel 43; and the automatic adjusting means is such that the length of web fed each cycle can be further adjusted minutely only between maximum and minimum limits, which is substantially the amount of web fed by the advancement of the ratchet wheel 43 by one tooth 47. The two adjustments, the manual and the automatic, are therefore dependent one upon the other and mutually cooperate to control the running register of the web 10 with respect to the various stations 17, 18 and 19 of the tag machine 14, and it is essential that the manual adjustment 41 of the driving mechanism be accurately made within one tooth 47, as otherwise the amount of error in the feeding of the web would be greater than what the automatic adjusting means is capable of correcting.

In order to insure the proper adjusting of the manual adjusting means 41 we provide means by which the movement of the block 33 beyond a predetermined point in either direction is prevented. And in conjunction therewith we also provide means by which the variation in the feeding of the web with respect to the stations 17, 18 and 19 is visually indicated. To this end we interpose a switch mechanism 110, in the circuit 111 to the motor 95, which when open will effect the de-energization of the motor 95 and thereby stop the rotation of the pinion gear 75 and consequently the movement of the block 33. The switch mechanism 110 is secured to the outer end of an arm 112 between mounting plates 113, and the arm 112 is mounted upon the slide 79 for rotary adjustment about the shaft 92 and is clamped in adjusted position by a set screw 114. The switch mechanism 110 includes a pair of outwardly biased depressible fingers 115 which when both are depressed maintain the switch closed. The fingers 115 are adapted to be held in depressed position during normal operation of the tag machine 14, when the manual adjusting means 41 has been properly adjusted within one tooth 47, by a pressure plate 116 which is secured to the free end of an arm 117 in position to engage the fingers 115. The arm 117 is clamped to the shaft 92, for rotation therewith, between the sprocket 98 and the arm 112 and has an arcuate slot 118 therein through which the set screw 114 extends. A pointer 119, which is secured to the underside of the outer end of the arm 112 and extends upwardly therefrom beyond the switch mechanism 110, is adapted to register with an index mark 120 on the end of the arm 117 to visually indicate any variation in the feeding of the web 10.

Figures 3, 4, 5, 6:
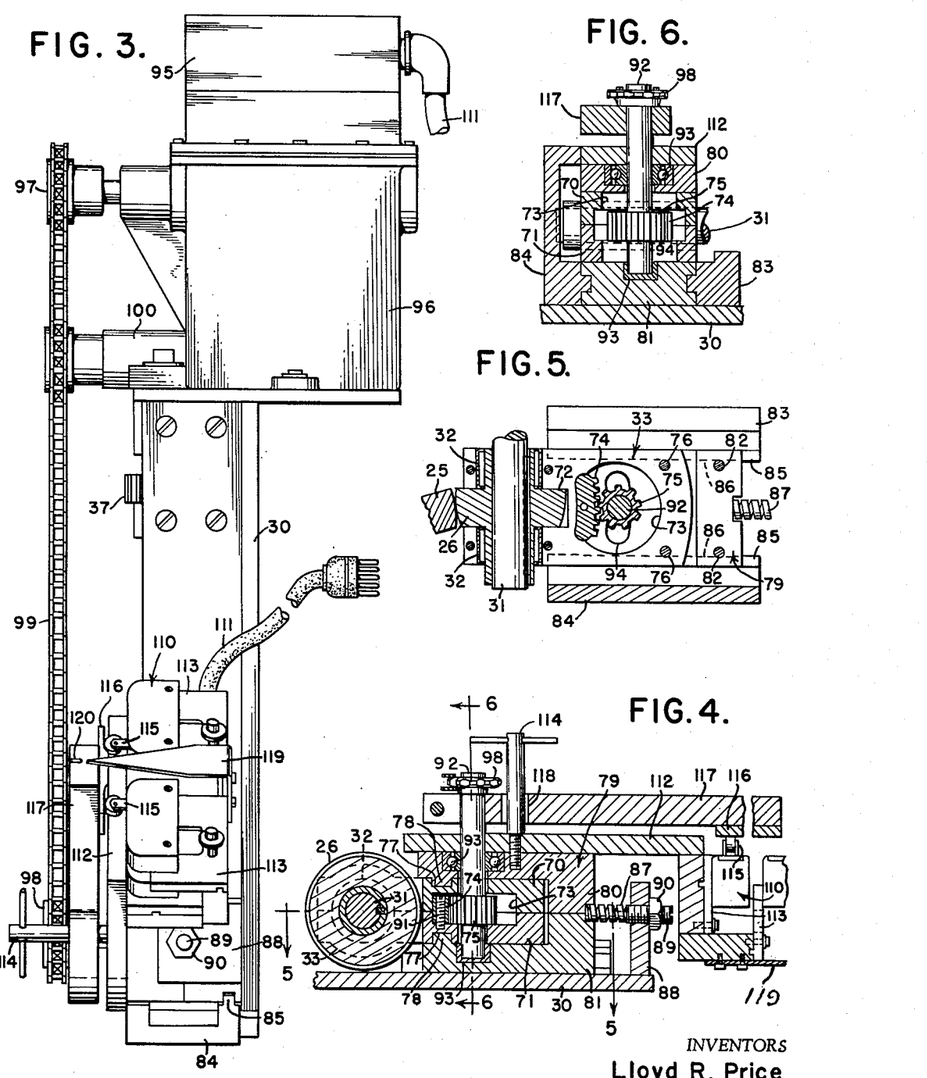
Fig. 3 is a side elevation of the mechanism shown in Fig. 2.
Fig. 4 is a sectional view taken on the line 4—4 of Fig. 2.
Fig. 5 is a sectional view taken on the line 5—5 of Fig. 4.
Fig. 6 is a sectional view taken on the line 6—6 of Fig. 4.

In setting up the tag machine for a particular tag and web the feed rollers 25 and 26 are first set as shown in Fig. 5, that is, with the lines of contact 63 of the rollers with a web therebetween in substantially mid position. This is effected through the motor 95 by a separate manually controlled circuit which is independent of the automatically controlled circuit therefor and is only used when initially adjusting the machine. The arm 112 is then set in such position that the pointer 119 carried thereby registers with the index mark 120 on the end of the arm 117. The driving mechanism 41 is next adjusted as accurately as possible within one tooth 47 of the ratchet wheel 43 and the tag machine set in operation. If it is found that too much web is being fed each cycle, the rollers are readjusted to bring the lines of contact 63 closer to the minimum diameter sides of the rollers; and if it is found that too little web is being fed each cycle, the rollers 25 and 26 are re-adjusted to bring the lines of contact 63 closer to the maximum diameter sides of the rollers. The arm 112 is then reset so that the pointer 119 registers with the index mark 120, in which position the pressure plate 116 is depressing both fingers 115 and thereby maintaining the switch mechanism 110 closed.

If the driving mechanism 41 is properly adjusted within one tooth 47, the correct running register of the web 10 with respect to the stations 17, 18 and 19 will be automatically maintained by the detector and control mechanism 105 in response to successive indexes 11 on the web 10. If, however, the adjustment of the driving mechanism 41 is out more than one tooth 47, either more or less, the arm 117, which rotates with the shaft 92 with respect to the roller 25, will move the pressure plate 116 out of engagement with one of the fingers 115, depending on whether too much or too little web is being fed each cycle, which will open the switch 110 and de-energize the motor 95. The operator will then know that the driving mechanism 41 must be re-adjusted, and the position of the arm 117 with respect to the pointer 119 will indicate whether the driving mechanism 41 should be adjusted to feed more or less web.

From the foregoing it will be apparent to those skilled in this art that we have provided a very simple and efficient method and apparatus for accomplishing the objects of our invention.

While our new and improved web feeding and registry control mechanism is shown and described herein in connection with a standard type tag machine, it is equally well applicable to various other types of machine where it is desired to feed an elongated web of material, either continuously or intermittently, and to properly maintain the running register thereof with respect to various operating stations in the machine.

And it is to be understood that we are not limited to the specific construction shown and described herein, as various modifications and changes may be made therein without departing from the spirit of the invention or the scope of the appended claims. For instance one of rollers 25 and 26 could have a toric periphery and the other a conical periphery. Also, one of the rollers 25 and 26 could have a cylindrical periphery and the other a toric periphery, in which case only the roller with the toric periphery would be positively driven. Furthermore, various different mechanisms for driving the feed rollers 25 and 26 could be substituted for the driving mechanism 41 shown and described herein.

Having thus described our invention, we claim:

1. A web feeding and registering mechanism for feeding an elongated web having recurrent patterns printed thereon in equally spaced relation to an operating station, comprising a pair of opposed feed rolls by and between which a web is adapted to be fed, at least one of said rolls having a generally toric periphery of such a nature that the diameter thereof progressively increases from a minimum adjacent one side thereof to a maximum adjacent the other side thereof, means for driving said rolls in unison in opposite directions, and means by which the angular relation of the axes of said rolls with respect to each other is automatically changed while maintaining said rolls in contact with a web therebetween.

2. A web feeding and registering mechanism as defined in claim 1 in which the means for changing the angular relation of the axes of said rolls with respect to each other is responsive to the recurrent patterns on said web.

3. A web feeding and registering mechanism for feeding an elongated web having recurrent patterns printed thereon in equally spaced relation to an operating station, comprising a pair of opposed feed rolls by and between which a web is adapted to be fed, one of said rolls being rotatably mounted in fixed position and the other of said rolls being secured on an adjustably mounted shaft, said other of said rolls having a generally toric periphery of such a nature that the diameter thereof progressively increases from a minimum adjacent one side thereof to a maximum adjacent the other side thereof, means for driving said other of said rolls, means for automatically shifting the position of said adjustably mounted shaft while maintaining said rolls in contact with a web therebetween to thereby change the angular relation of the axes of said rolls with respect to each other.

4. A web feeding and registering mechanism as defined in claim 3 in which the means for automatically shifting the position of said adjustably mounted shaft is responsive to the recurrent patterns on said web.

5. A web feeding mechanism for feeding an elongated web to an operating station in a tag machine or the like, comprising a pair of opposed feed rolls by and between which a web is adapted to be fed, one of said rolls having a generally toric periphery of such a nature that the diameter thereof progressively increases from a minimum adjacent one side thereof to a maximum adjacent the other side thereof, means for rotating said one of said rolls, and means by which the angular relation of the axes of said pair of rolls may be changed with respect to each other to thereby increase or decrease the length of web fed by each revolution of said one of said rolls.

6. A web feeding mechanism of the character defined in claim 5 in which the means by which the angular relation of the axes of said pair of rolls with respect to each other is changed is rendered operative and inoperative by a detector which is responsive to recurrent patterns on said web.

7. A web feeding mechanism for feeding an elongated web to an operating station in a tag machine or the like, comprising a pair of opposed feed rolls by and between which a web is adapted to be fed, each of said rolls having a generally toric periphery of such a nature that the diameter of said rolls progressively increases from a minimum adjacent one side of said rolls to a maximum adjacent the other side of said rolls, means by which said rolls are rotated in unison in opposite directions, and means by which the angular relation of the axes of said rolls may be changed with respect to each other to thereby increase or decrease the length of web fed by each revolution of said rolls.

8. A web feeding mechanism for feeding an elongated web to an operating station in a tag machine or the like, comprising a pair of opposed feed rolls by and between which a web is adapted to be fed, each of said rolls having a generally toric periphery of such a nature that the diameter of said rolls progressively increases from a minimum adjacent one side of said rolls to a maximum adjacent the other side of said rolls, means by which said rolls are intermittently rotated in unison in opposite directions, manually adjustable means by which the length of web fed by each actuation of said rolls may be increased or decreased, and means by which the angular relation of the axes of said rolls with respect to each other may be automatically changed to thereby further increase or decrease the length of web fed by each actuation of said rolls.

9. A web feeding mechanism of the character defined in claim 8 in which the means by which the angular relation of the axes of said pair of rolls with respect to each other is changed is rendered operative and inoperative by a detector which is responsive to recurrent patterns on said web.

10. A web feeding mechanism for feeding an elongated web to an operating station in a tag machine or the like, comprising a pair of opposed feed rolls by and between which a web is adapted to be fed, one of said rolls having a generally toric periphery of such a nature that the diameter thereof progressively increases from a minimum adjacent one side thereof to a maximum adjacent the other side thereof, means by which said one of said rolls is intermittently rotated, manually adjustable means by which the length of web fed by each actuation of said one of said rolls may be increased or decreased, and means by which the angular relation of the axes of said pair of rolls with respect to each other may be automatically changed to thereby further increase or decrease the length of web fed by each actuation of said one of said rolls.

11. A web feeding mechanism of the character defined in claim 10 in which the means by which the angular relation of the axes of said pair of rolls with respect to each other is changed is rendered operative and inoperative by a detector which is responsive to recurrent patterns on said web.

12. A web feeding and registering mechanism for a tag machine or the like by which an elongated web having recurrent patterns in equally spaced relation thereon is fed to an operating station, comprising a base, a pair of opposed feeding rolls by and between which a web is adapted to be fed, each of said rolls having a generally toric periphery of such a nature that the diameters thereof progressively increase from a minimum adjacent one side of said rolls to a maximum adjacent the other side of said rolls, a first shaft rotatably supported in fixed position by suitable bearing carried by said base, one of said rollers being secured on said first shaft for rotation therewith, a slide slidably mounted on said base for transverse movement with respect to said first shaft, an arcuate guideway in said slide, a bearing block carried by said slide for back or forth movement on said guideway, a second shaft rotatably mounted in suitable bearings carried by said bearing block, the other of said rollers being secured on said second shaft for rotation therewith, means by which said first shaft is rotated, means by which said second shaft is rotated by said first shaft in unison therewith, means by which said bearing block is adjusted back or forth on said guideway to thereby change the angular relation of the axis of said second shaft with respect to the axis of said first shaft, and means resiliently biasing said slide towards said first shaft to thereby maintain said pair of rolls in contact with a web therebetween.

13. A web feeding and registering mechanism as defined in claim 12 in which the adjusting means for said bearing block comprises a meshing rack and pinion one of which is carried by said bearing block, and a reversible electric motor by which said pinion is rotated.

14. A web feeding and registering mechanism as defined in claim 13 in which the energization of said reversible electric motor is controlled by a detector which is responsive to the recurrent patterns on said web.

15. A web feeding and registering mechanism as defined in claim 14 in which means is provided by which said electric motor is de-energized after said pinion has been rotated a predetermined amount in either direction.

16. A web feeding and registering mechanism for a tag machine or the like by which an elongated web having recurrent patterns in equally spaced relation thereon is fed to an operating station, comprising a base, a pair of opposed feeding rolls by and between which a web is adapted to be fed, each of said rolls having a generally toric periphery of such a nature that the diameters thereof progressively increase from a minimum adjacent one side of said rolls to a maximum adjacent the other side of said rolls, a first shaft rotatably supported in fixed position by suitable bearing carried by said base, one of said rollers being secured on said first shaft for rotation therewith, a slide slidably mounted on said base for transverse movement with respect to said first shaft, an arcuate guideway in said slide, a bearing block carried by said slide for back or forth movement on said guideway, a second shaft rotatably mounted in suitable bearings carried by said bearing block, the other of said rollers being secured on said second shaft for rotation therewith, means by which said first shaft is intermittently rotated, means by which said second shaft is rotated by said first shaft in unison therewith, manually adjustable means by which the length of web fed by said rolls each actuation of said shafts may be increased or decreased, means by which said bearing block is automatically adjusted back and forth on said guideway to change the angular relation of the axis of said second shaft with respect to the axis of said first shaft to thereby further increase or decrease the length of web fed by said rolls each actuation of said shafts, and means resiliently biasing said slide toward said first shaft whereby said rolls are maintained in contact with a web therebetween.

17. A web feeding and registering mechanism as defined in claim 16 in which the means for automatically adjusting said bearing block comprises a meshing rack and pinion, one of which is carried by said bearing block, and a reversible electric motor by which said pinion is rotated.

18. A web feeding and registering mechanism as defined in claim 17 in which means is provided by which said electric motor is de-energized after said pinion has been rotated a predetermined amount in either direction.

19. A web feeding and registering mechanism for a tag machine or the like by which an elongated web having recurrent patterns in equally spaced relation thereon is fed to an operating station, comprising a base, a pair of opposed feeding rolls by and between which a web is adapted to be fed, one of said rolls having a generally toric periphery of such a nature that the diameter thereof progressively increases from a minimum adjacent one side thereof to a maximum adjacent the other side thereof, a slide slidably mounted on said base, an arcuate guideway on said slide, a bearing block carried by said slide for back or forth movement on said guideway, a shaft rotatably mounted in suitable bearings carried by said bearing block, said one of said rolls being secured on said shaft for rotation therewith, drive means by which said shaft is rotated, means by which the other of said rolls is rotatably mounted in fixed position on said base, means by which said bearing block is adjusted back or forth on said guideway to thereby change the angular relation of the axis of rotation of the said one of said rolls with respect to the axis of rotation of the other of said rolls, and means resiliently biasing said slide toward the said other of said rolls to thereby maintain said rolls in contact with a web therebetween.

20. A web feeding and registering mechanism as defined in claim 19 in which the drive means for said shaft is operative to intermittently rotate said shaft and the roll secured thereon, and in which the operation of the means for adjusting said guide block back or forth is automatically controlled by a detector which is responsive to the recurrent patterns on said web.

21. A web feeding and registering mechanism as defined in claim 20 in which the drive means for said shaft includes manually adjustable means by which the length of web fed by each intermittent actuation of said shaft may be increased or decreased.

References Cited in the file of this patent
UNITED STATES PATENTS

| Number | Name | Date |
|---|---|---|
| 1,331,579 | Rosenfeld | Feb. 24, 1920 |
| 2,466,686 | Connelly | Apr. 12, 1949 |
| 2,548,136 | Auer | Apr. 10, 1951 |
| 2,706,944 | Claff et al. | Apr. 26, 1955 |
| 2,738,729 | Brooks | Mar. 19, 1956 |
| 2,752,657 | Meneo | July 3, 1956 |